May 10, 1966 N. PER MATHIESEN 3,250,275

MAGNETIC CARD WHEEL

Filed March 22, 1963

INVENTOR

Nicolaus Per Mathiesen,

BY Watson, Cole, Grindle & Watson,

ATTORNEYS

United States Patent Office 3,250,275
Patented May 10, 1966

3,250,275

MAGNETIC CARD WHEEL

Nicolaus Per Mathiesen, 1512 Primm Ave.,
San Jose, Calif.

Filed Mar. 22, 1963, Ser. No. 267,274
9 Claims. (Cl. 129—16)

This invention relates to card filing devices and particularly to a rotary card index device, sometimes referred to as a card wheel, and to cards especially adapted for use therewith. Certain types of rotary card indexes are now in use, such devices, for the most part, being relatively expensive and cumbersome. A general object of the present invention is to provide a rotary card index of relatively simple and inexpensive nature, which is easily portable, and is of such a nature as greatly to facilitate and simplify its use, thereby correspondingly enhancing its utility.

Rotary card indexes, or card wheels, are mostly used for reference, cards seldom being removed and replaced or renewed. For this reason the cards, which are intended to remain on the wheel for long periods of time, are likely to become soiled, disfigured, or injured through repeated and rough handlings. It is therefore highly desirable to provide a card wheel of such a nature that the cards may be readily displayed, for reference, without touching the cards. The present invention makes this possible by employing cards provided with magnetic areas and which may be caused to "fan out" or spread apart by magnetic repulsion between their respective magnetic areas, induced by means of a permanent magnet in association with the card wheel.

Magnetic card filing devices employing the magnetic repulsion effect just mentioned have been known for some years, and are the subject matter of several United States patents issued to the present applicant. In co-pending application Serial No. 267,135, filed March 22, 1963, there is described and claimed a card filing device employing a single permanent magnet and a plurality of index cards each provided with a magnetic area adjacent its lower edge and in close juxtaposition to the said magnet. The present invention adapts the features of the said co-pending application to a rotary card index employing cards essentially similar to those mentioned above.

Accordingly, it is a primary object of the present invention to provide a rotary, magnetic card index device comprising a hollow drum of non-magnetic material fixed on a spindle or other means for rotating said drum about its axis, a permanent magnet disposed within and extending axially of the drum and having its poles directed toward and away from said axis, respectively, and a plurality of index cards arranged in annular series about the exterior of the drum in planes parallel to said axis, i.e., in face-to-face relation, each said card having a magnetic area adjacent that edge which is attached to the drum and thus lies nearest the axis of the drum, whereby rotation of the drum subjects the magnetic areas of successive groups of cards to the field of the permanent magnet, thus inducing identical magnetic fields in the said magnetic areas and causing the cards to spread apart or fan out through the magnetic repulsion effect.

An additional object of the invention is the provision, in such a device, of means for moving the permanent magnet to a limited degree about the axis of the drum so as to cause the fanning effect to traverse a portion of the cards on the drum without rotating the latter.

Other objects are the provision of a rotary device of the character described, and of an index card suitable for use with a device of the character described.

Other and further objects, features and advantages will be apparent from the description which follows, read in connection with the accompanying drawings, in which.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Figures 3, 4:
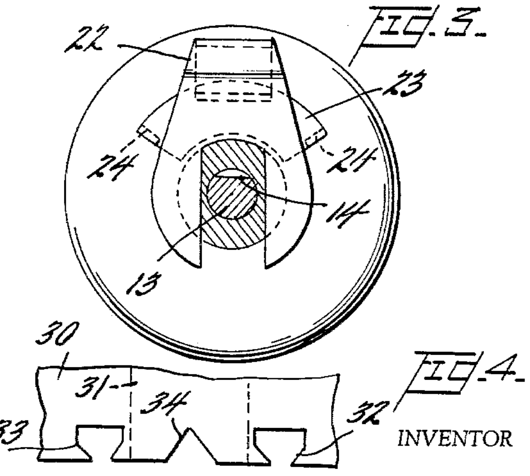
FIGURE 3 is a vertical transverse section on line 3—3 of FIGURE 1.
FIGURE 4 is a fragmentary elevational view of an index card according to the invention.

Referring to the drawings, the numeral 10 designates a base or frame formed of any suitable material and in any suitable configuration, the sole purpose of the frame 10 being to provide bearings 11 and 12 for the support of the rotating parts and, at the same time, clearance for the index cards as they rotate and an unobstructed view of the latter from above. A spindle 13 is journaled in the bearings 11 and 12, which generally cylindrical spindle is provided with a flattened area 14 (FIG. 3) extending from end to end thereof. A drum 15 is secured on the spindle 13 by means of a set screw 16 engaging the flattened area 14 of the spindle, the drum 15 comprising two half portions 15*a* and 15*b* joined together with a pressed fit by means of a collar 17. The drum 15 and collar 17 are made of non-magnetic materials, the drum being suitably fabricated of plastic and the collar 17 of aluminum. The drum 15 is provided on its outer surface with two circumferential rails 18 and 19 which are suitably spaced apart, for example, each being spaced from the adjacent end of the drum to a distance of about one-third of the drum length. As illustrated, the rails 18 and 19 may suitably be of T-section. The hub 20 of the drum portion 15*a* is provided with an axial opening having a flattened area to fit snugly on the spindle 13, the hub 20 having a somewhat shorter axial dimension than that of the circumferential portion of the drum portion 15*a*.

A sleeve 21 of non-magnetic material is mounted upon and surrounds the spindle 13 and is movable angularly in relation thereto, the drum portion 15*b* being journaled upon the sleeve 21 so as to be rotatable thereon. A handle 22, fixed on the sleeve 21 exteriorly of the drum 15 is movable in close juxtaposition to a sector-shaped member 23 secured on top of the bearing portion 12 of the frame 10, the member 23 being provided with projections 24 at its extremities to serve as stops for the handle 22, thus limiting the permissible angular movement of the sleeve 21.

Figure 1:
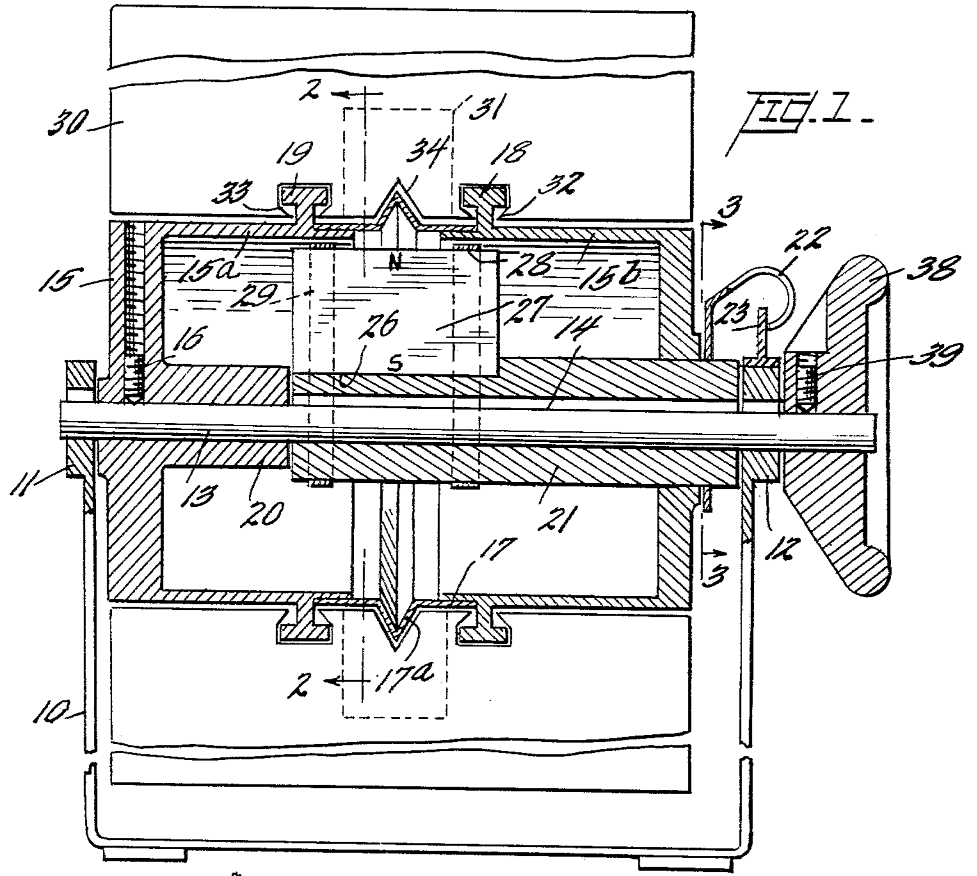
FIGURE 1 is an axial section of a device constructed in accordance with the invention.
Figure 2:
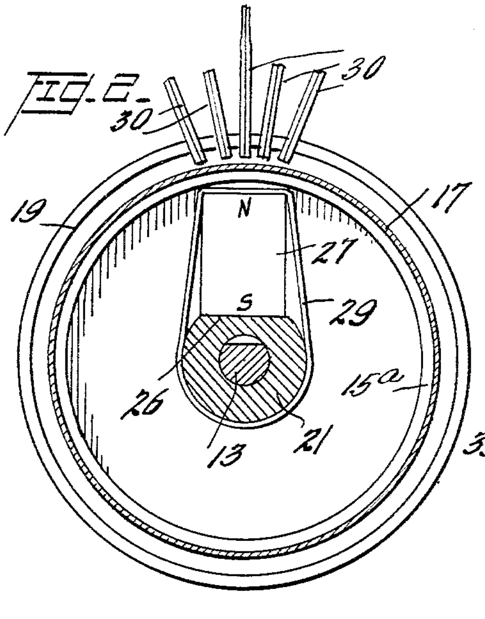
FIGURE 2 is a vertical transverse section on line 2—2 of FIGURE 1.

The sleeve 21 is provided with a flattened area 26 (FIG. 2) on which is mounted a permanent magnet 27, which is secured to the sleeve 21 in any suitable manner, for example, by means of brass straps 28 and 29. The magnet 27 is relatively long and narrow, and is disposed with its respective elongated poles extending axially of the drum 15 and directed toward and away from the spindle 13 or, in other words, directed radially in opposite directions. The normal position of the magnet 27 is directly above the spindle 13, but it may be moved angularly about the spindle 13 to a limited degree. The spindle 13 may be rotated by means of a handle 38 fixed on its extremity by means of a set screw 39.

The drum 15 may be provided with any suitable number of index cards 30, each of which is provided with a magnetic area 31 adjacent its inner edge, i.e., that edge which is nearest the drum 15. The magnetic area 31 may suitably be formed by a thin layer of ferrous material, interleaved between the paper lamina making up the card 30. Each card 30 is provided with undercut grooves 32 and 33 adapted to receive the rails 18 and 19 of the drum 15 and thereby to retain the cards on the drum, the cards being formed of sufficiently flexible material so that they may be snapped over the rails. Each card is also provided with a V-shaped notch 34 between the grooves 32 and 33, for cooperation with a similarly shaped annular ridge **17*a* formed on the collar 17. The cooperation between the ridge 17*a* and the notches 34 prevents undue friction between the cards 30 and the rails 18, 19 which might otherwise be caused by the tendency of the cards to move axially of the device under the attraction of the magnet 27**.

When the spindle 13 is rotated by means of the handle 38, the drum 15 rotates with it while the sleeve 21 and magnet 27 remain stationary. As the magnetic areas 31 of the cards 30 pass successively through the field of the magnet 27, like magnetic fields are induced therein whereby each magnetic area 31 tends to repel its neighbors. Accordingly, the cards immediately above the magnet 27 will separate or fan out in such a way that the information inscribed thereon can be read without handling the cards. When it is desired to further expose a single card for more careful inspection, the drum is adjusted so that the card in question is substantially at its highest position, then the magnet 27 is moved angularly by means of the handle 22, thus moving the magnetic field in such a way that the desired card is caused to drop away from those which are still retained in the magnetic field, thus exposing its full surface to view.

If it is desired to examine a few cards without rotating the drum, those cards attached to the drum over a limited area near the presently uppermost portion of the drum may be caused successively to fan out by moving the magnet 27 through a limited angle.

Having thus described the invention, what is claimed as new and desired to be secured by Letters Patent is:

1. In a rotary magnetic card index device, in combination, a frame, a generally horizontal spindle supported in said frame for rotation relative thereto, a hollow drum of non-magnetic material fixed on said spindle for rotation therewith, card engaging means disposed around said drum externally thereof, a plurality of cards detachably engaging said means adjacent one edge of each card, said cards being disposed in planes parallel to the axis of said spindle, said edge of each card being directed toward said spindle, each said card having an unmagnetized magnetic area adjacent the said edge thereof, permanent magnet means having oppositely facing poles, and means supporting said magnet means within said drum at a location adjacent the orbit described by said magnetic areas of said cards upon rotation of said drum, said magnet means being disposed with its opposite magnetic poles directed radially toward and away from said spindle, respectively, whereby a pole of said magnet means is disposed below and adjacent said magnetic areas of certain of said cards.

2. The combination defined in claim 1, said magnet supporting means being adjustable about the axis of said spindle.

3. The combination defined in claim 2, said magnet supporting means comprising a sleeve mounted on and angularly movable relative to said spindle, and means for securing said magnet means on said sleeve.

4. The combination defined in claim 3, including a handle fixed on said sleeve externally of said drum for angularly adjusting said sleeve, and means limiting the angular movement of said sleeve.

5. The combination of claim 1, said drum including an external ridge extending therearound intermediate the ends thereof and said cards being notched on their said edges to cooperate with said ridge to restrain endwise movement of said cards.

6. A rotary magnetic card index device for detachably supporting an annular series of edgewise disposed cards each having an unmagnetized magnetic area adjacent the inwardly directed edge thereof, said device comprising a frame, a generally horizontal spindle rotatably supported in said frame, a non-magnetic hollow drum fixed on said spindle, card-engaging means disposed around said drum externally thereof, permanent magnet means having opposite facing poles, and means supporting said magnet means within said drum adjacent the periphery thereof, said magnet means being disposed with its opposite magnetic poles directed radially toward and away from said spindle, respectively, whereby a pole of said magnet means is disposed below and adjacent said magnetic areas of certain of said cards.

7. The device of claim 6, said magnet supporting means being adjustable about the axis of said spindle.

8. The device of claim 7, said magnet supporting means comprising a sleeve mounted on and angularly movable relative to said spindle, and means for securing said magnet means on said sleeve.

9. The device of claim 8, including a handle fixed on said sleeve externally of said drum for angularly adjusting said sleeve, and means limiting the angular movement of said sleeve.

References Cited by the Examiner

UNITED STATES PATENTS

| | | | |
|---|---|---|---|
| 2,703,744 | 3/1955 | Karper | 129—16 X |
| 2,762,373 | 9/1956 | Rosenberg | 129—16 |
| 2,975,014 | 3/1961 | Dahl | 129—16 X |
| 3,033,208 | 5/1962 | Mathiesen | 129—16 |

JEROME SCHNALL, *Primary Examiner.*